(12) United States Patent
Tsubouchi et al.

(10) Patent No.: US 11,763,831 B2
(45) Date of Patent: Sep. 19, 2023

(54) OUTPUT APPARATUS, OUTPUT METHOD AND NON-TRANSITORY COMPUTER-READABLE RECORDING MEDIUM

(71) Applicant: Yahoo Japan Corporation, Tokyo (JP)

(72) Inventors: Kota Tsubouchi, Tokyo (JP); Teruhiko Teraoka, Tokyo (JP); Hidehito Gomi, Tokyo (JP); Junichi Sato, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 71 days.

(21) Appl. No.: 17/198,125

(22) Filed: Mar. 10, 2021

(65) Prior Publication Data

US 2021/0358511 A1 Nov. 18, 2021

(30) Foreign Application Priority Data

Mar. 19, 2020 (JP) .................................. 2020-050261

(51) Int. Cl.
*G10L 21/003* (2013.01)
*G10L 15/06* (2013.01)
*G10L 15/22* (2006.01)

(52) U.S. Cl.
CPC ............ *G10L 21/003* (2013.01); *G10L 15/06* (2013.01); *G10L 15/22* (2013.01)

(58) Field of Classification Search
CPC ....... G10L 21/003; G10L 15/06; G10L 15/22; G10L 15/26; G10K 11/17823; G10K 11/17873; G10K 2210/105; G10K 2210/30231; G10K 2210/3024; G10K 2210/3033; G10K 2210/3048;
(Continued)

(56) References Cited

U.S. PATENT DOCUMENTS 5,135,079 A * 8/1992 Shimazaki ....... G10K 11/17823
187/254
7,088,828 B1 * 8/2006 Bradford .......... G10K 11/17823
704/226

(Continued)

FOREIGN PATENT DOCUMENTS

JP 2012119996 A 6/2012
JP 2014-206683 A 10/2014
(Continued)

OTHER PUBLICATIONS

Japanese Patent Office, Notice of Reasons for Refusal, Application No. JP 2020-050261, dated May 19, 2022, in 4 pages.
(Continued)

*Primary Examiner* — Thuykhanh Le
(74) *Attorney, Agent, or Firm* — Procopio, Cory, Hargreaves & Savitch LLP

(57) ABSTRACT

An output apparatus according to the present application includes a prediction unit and an output unit. The prediction unit predicts whether or not waveform information having a predetermined context is generated on the basis of detection information detected by a predetermined detection device. The output unit outputs waveform information having an opposite phase to the waveform information having the predetermined context in a case where it has been predicted that the waveform information having the predetermined context is generated.

11 Claims, 5 Drawing Sheets

(58) Field of Classification Search
CPC ...... G06F 40/211; G06F 40/268; G06F 40/30; G06F 2221/2111; G06F 21/6245
USPC .......................................................... 704/231
See application file for complete search history.

(56) References Cited

U.S. PATENT DOCUMENTS

| | | | | |
|---|---|---|---|---|
| 10,118,692 | B1* | 11/2018 | Beckman | G08G 5/006 |
| 10,370,098 | B1* | 8/2019 | Beckman | B64C 27/57 |
| 10,791,219 | B1* | 9/2020 | McGuire | H04M 3/4285 |
| 10,878,819 | B1* | 12/2020 | Chavez | G10L 15/25 |
| 10,884,096 | B2* | 1/2021 | Baek | H04W 4/02 |
| 11,026,035 | B1* | 6/2021 | Doy | H04R 3/04 |
| 11,308,954 | B2* | 4/2022 | Maeng | G05B 13/027 |
| 11,386,890 | B1* | 7/2022 | Fan | G06F 40/30 |
| 2003/0139851 | A1* | 7/2003 | Nakadai | G10L 21/0208 700/258 |
| 2005/0209856 | A1* | 9/2005 | Kii | H04L 67/62 704/E15.04 |
| 2006/0045219 | A1* | 3/2006 | Wang | G06K 7/0008 375/346 |
| 2006/0270468 | A1* | 11/2006 | Hui | H04M 9/082 455/570 |
| 2007/0034444 | A1* | 2/2007 | Yaoita | F01N 1/06 181/224 |
| 2007/0223714 | A1* | 9/2007 | Nishikawa | G10K 11/17857 381/71.1 |
| 2008/0154592 | A1* | 6/2008 | Tsujikawa | H04R 3/005 704/255 |
| 2008/0268913 | A1* | 10/2008 | Heikkinen | H04M 1/6066 455/569.1 |
| 2012/0204887 | A1* | 8/2012 | Connor | A61F 5/56 128/848 |
| 2012/0226981 | A1* | 9/2012 | Clavin | G06F 3/005 715/750 |
| 2013/0148821 | A1* | 6/2013 | Sorensen | H04M 9/082 381/80 |
| 2014/0163977 | A1* | 6/2014 | Hoffmeister | G10L 15/22 704/232 |
| 2014/0172426 | A1* | 6/2014 | Aratsu | G10L 21/0208 704/235 |
| 2014/0188477 | A1* | 7/2014 | Zhang | G10L 15/22 704/257 |
| 2014/0195249 | A1* | 7/2014 | Chung | G10L 21/06 704/275 |
| 2015/0082175 | A1* | 3/2015 | Onohara | G06F 3/167 715/728 |
| 2015/0208171 | A1* | 7/2015 | Funakoshi | H04N 5/602 381/26 |
| 2016/0042749 | A1* | 2/2016 | Hirose | G10L 25/63 704/270.1 |
| 2016/0111078 | A1* | 4/2016 | Barath | G10K 11/17879 381/71.7 |
| 2016/0118036 | A1* | 4/2016 | Cheatham, III | H04M 11/025 380/252 |
| 2017/0169817 | A1* | 6/2017 | VanBlon | G10L 15/02 |
| 2018/0325470 | A1* | 11/2018 | Fountaine | G08B 21/0469 |
| 2018/0369689 | A1* | 12/2018 | Murata | A63F 13/235 |
| 2019/0079724 | A1* | 3/2019 | Feuz | G06F 3/167 |
| 2019/0082055 | A1* | 3/2019 | Son | G10L 25/63 |
| 2019/0087152 | A1* | 3/2019 | Aggarwal | G06Q 10/10 |
| 2019/0106205 | A1* | 4/2019 | Konishi | B64C 39/024 |
| 2019/0108827 | A1* | 4/2019 | Konishi | G10K 11/17881 |
| 2019/0295542 | A1* | 9/2019 | Huang | G06F 3/167 |
| 2020/0051545 | A1* | 2/2020 | Iwase | G10L 13/06 |
| 2020/0074993 | A1* | 3/2020 | Lee | G10L 15/22 |
| 2020/0092339 | A1* | 3/2020 | Rakshit | G10L 25/63 |
| 2020/0221236 | A1* | 7/2020 | Jensen | H04R 25/505 |
| 2020/0234700 | A1* | 7/2020 | Heltewig | G06F 40/56 |
| 2020/0342896 | A1* | 10/2020 | Kanai | G06V 10/82 |
| 2020/0357383 | A1* | 11/2020 | Deng | G10L 13/027 |
| 2021/0142796 | A1* | 5/2021 | Saito | G10L 13/00 |
| 2021/0142816 | A1* | 5/2021 | Yamada | G10K 11/17827 |
| 2021/0258754 | A1* | 8/2021 | Bolot | H04W 4/029 |
| 2021/0264908 | A1* | 8/2021 | Nagar | G10L 15/22 |
| 2021/0347409 | A1* | 11/2021 | Nakano | B62D 13/00 |
| 2021/0398517 | A1* | 12/2021 | Iwase | G10L 15/183 |
| 2022/0095033 | A1* | 3/2022 | Shinmen | G10K 11/17857 |
| 2022/0122600 | A1* | 4/2022 | Tateishi | G06F 3/167 |
| 2022/0157303 | A1* | 5/2022 | Taki | G10L 15/22 |
| 2022/0189448 | A1* | 6/2022 | Oosugi | G10K 11/17885 |
| 2022/0225930 | A1* | 7/2022 | Huang | A61B 5/4812 |
| 2022/0293126 | A1* | 9/2022 | Ogita | G08B 1/08 |

FOREIGN PATENT DOCUMENTS

| | | |
|---|---|---|
| JP | 2017-107078 A | 6/2017 |
| JP | 2017175584 A | 9/2017 |
| JP | 6392950 B1 | 9/2018 |
| JP | 2019-139089 A | 8/2019 |

OTHER PUBLICATIONS

Japanese Patent Office, Decision of Refusal, Application No. JP 2020-050261, dated Oct. 18, 2022, in 3 pages.
Office Action dated Jul. 4, 2023 for related Japanese Patent application JP 2020-050261. 3 pages.

* cited by examiner

| SPEECH HISTORY ID | TARGET SPEECH | PRE-SPEECH | ... |
|---|---|---|---|
| RE1 | TARGET SPEECH #1 | PRE-SPEECH #1 | ... |
| RE1 | TARGET SPEECH #2 | PRE-SPEECH #2 | ... |
| ... | ... | ... | ... | though
OUTPUT APPARATUS, OUTPUT METHOD AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2020-050261 filed in Japan on Mar. 19, 2020.

BACKGROUND OF THE INVENTION

1. Field of the Invention

The present invention relates to an output apparatus, an output method, and a non-transitory computer-readable recording medium.

2. Description of the Related Art

Conventionally, a voice dialogue device that searches for desired information from the Internet or controls home appliances in a home by voice dialogue has been known. For example, the voice dialogue device is a device that can use an artificial intelligence (AI) assistant function that supports a dialogue-type voice operation, and is called a smart speaker. A user acquires various information by dialoguing with the smart speaker.

However, in the conventional technology described above, it is not always possible to appropriately remove predetermined waveform information. For example, in the conventional technology described above, it was not always possible to appropriately remove a voice that needs to be removed in consideration of the privacy of the user in a voice output by the smart speaker.

SUMMARY OF THE INVENTION

It is an object of the present invention to at least partially solve the problems in the conventional technology.

According to an example of a subject matter described in a present disclosure, an output apparatus includes a prediction unit that predicts whether or not waveform information having a predetermined context is generated on the basis of detection information detected by a predetermined detection device, and an output unit that outputs waveform information having an opposite phase to the waveform information having the predetermined context in a case where it has been predicted that the waveform information having the predetermined context is generated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
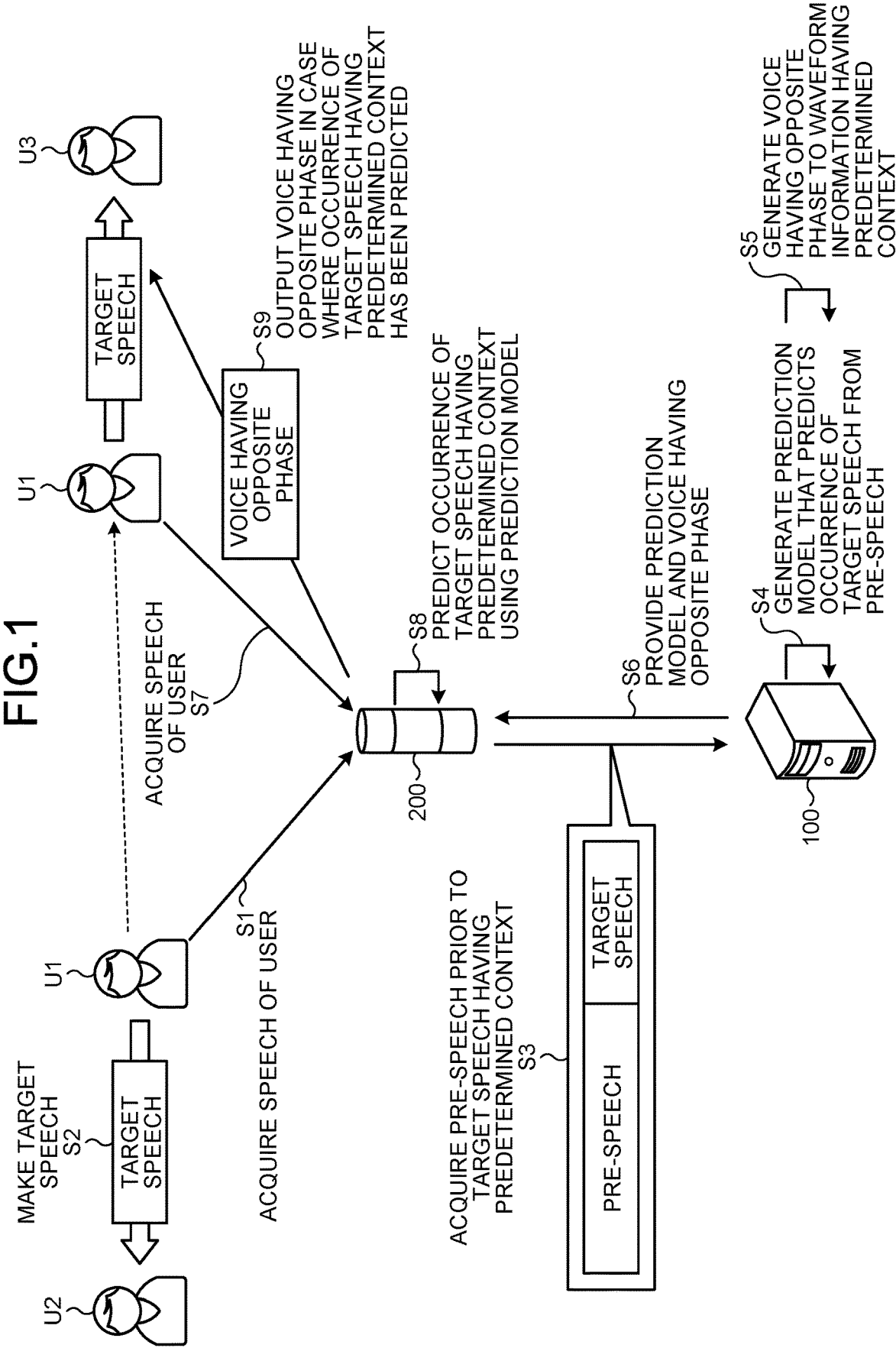
FIG. 1 is a diagram illustrating an example of output processing executed by an output apparatus according to an embodiment.

Hereinafter, a mode (hereinafter referred to as "an embodiment") for carrying out an output apparatus, an output method, and a non-transitory computer-readable recording medium according to the present application will be described in detail with reference to the drawings. Note that the output apparatus, the output method, and the non-transitory computer-readable recording medium according to the present application are not limited by this embodiment. In addition, the respective embodiments can be appropriately combined with each other as long as processing contents do not contradict each other. In addition, in each of the following embodiments, the same portions will be denoted by the same reference numerals, and an overlapping description thereof will be omitted.

1. Example of Output Processing Indicated by Output Apparatus

First, an example of output processing executed by an output apparatus 200 will be described with reference to FIG. 1. FIG. 1 is a diagram illustrating an example of output processing executed by an output apparatus 200 according to an embodiment. In the example of FIG. 1, it is assumed that a user U1 utters personal information that can specify the user U1 to the other users U2 and U3. In this case, the output apparatus 200 executes processing for excluding the personal information. In addition, in the example of FIG. 1, it is assumed that the user U1 utters to the user U3 after a predetermined time has elapsed from a time when the user U1 utters to the user U2.

Note that here, the output apparatus 200 is an input/output apparatus that has a microphone acquiring an ambient sound and a speaker capable of outputting an arbitrary sound, and will be described as, for example, a device called a smart speaker.

In a case where a voice having a predetermined context has been uttered by the user U1 as waveform information specified by a context, such an output apparatus 200 shields the utterance of the user U1 by outputting a voice having an opposite phase to the voice having the predetermined context. That is, the output apparatus 200 predicts generation of waveform information having a predetermined context, and shields the waveform information having the predetermined context by outputting waveform information having an opposite phase to such waveform information in a case where it is predicted that the waveform information having the predetermined context will be generated.

For example, the output apparatus 200 acquires a pre-speech made before the user U1 utters a target speech having a predetermined context as a context when the target speech occurs. Then, the output apparatus 200 predicts the occurrence of the target speech and shields the target speech by outputting a voice having an opposite phase to the target speech, in a case where a context similar to the acquired context has occurred (for example, in a case where the user has made an utterance similar to the pre-speech when he/she has uttered the target speech).

Hereinafter, a specific example will be described with reference to FIG. 1. As illustrated in FIG. 1, the output apparatus 200 acquires a speech of the user U1 (Step S1). For example, the output apparatus 200 acquires a voice indicated by a speech such as "Yesterday, my friend A called me on my telephone number 090-XXXX-XXXX" as the speech of the user U1. In this case, the output apparatus 200 acquires waveform information of the voice indicating "Yesterday, my friend A called me on my telephone number 090-XXXX-XXXX".

Subsequently, the user U1 makes a target speech to the user U2 (Step S2). For example, the user U1 utters a speech such as "Yesterday, my friend A called me on my telephone number 090-XXXX-XXXX" to the user U2. Here, it is assumed that the target speech is "090-XXXX-XXXX".

The target speech indicating such a telephone number may damage privacy. Therefore, an information processing device 100 sets such a speech that may damage the privacy as a speech having a predetermined context, that is, a target speech. For example, the information processing device 100 acquires a pre-speech prior to the target speech having the predetermined context from the output apparatus 200 (Step S3). For example, the information processing device 100 acquires waveform information of a voice indicated by "Yesterday, my friend A called me on my telephone number" from the output apparatus 200 with "Yesterday, my friend A called me on my telephone number" positioned in front of the target speech "090-XXXX-XXXX" as the pre-speech. Note that Steps 1 and 2 may be performed at the same time or may be performed in no particular order. For example, Step 2 may be performed earlier than Step 1.

Subsequently, the information processing device 100 generates waveform information having a predetermined context, that is, a prediction model that predicts the occurrence of the target speech, from the pre-speech (Step S4). For example, the information processing device 100 generates a prediction model that outputs a probability that the target speech having the predetermined context will be uttered in a case where the waveform information of the voice indicated by the pre-speech has been input, by learning the waveform information of the voice indicated by the pre-speech and the waveform information of the voice indicated by the target speech having the predetermined context.

In addition, the information processing device 100 generates a voice having an opposite phase to the waveform information having the predetermined context (Step S5). Specifically, the information processing device 100 generates waveform information having the opposite phase that cancels the waveform information of the voice indicated by the target speech in order to remove the target speech having the predetermined context.

For example, the information processing device 100 generates waveform information having the opposite phase from the waveform information of the voice indicated by the target speech "090-XXXX-XXXX" by a conventional technology used for noise cancellation or the like.

Then, the information processing device 100 provides the output apparatus 200 with the prediction model and the voice having the opposite phase (Step S4). For example, in a case where the waveform information of the voice indicated by the pre-speech has been input, the information processing device 100 provides the output apparatus 200 with the prediction model that outputs a probability that the target speech having the predetermined context will be uttered and the waveform information having the opposite phase to the voice indicated by the target speech "090-XXXX-XXXX".

In addition, a case where a predetermined time has elapsed from a time when the user U1 has made an utterance to the user U2 will be described. At this time, the output apparatus 200 acquires the speech of the user U1 (Step S7). For example, the output apparatus 200 acquires a voice indicated by a speech such as "Yesterday, my friend A called me on my telephone number 090-XXXX-XXXX" as a speech of the user U1 to the user U3. In this case, the output apparatus 200 acquires waveform information of a voice indicating "Yesterday, my friend A called me on my telephone number . . . ".

Subsequently, the output apparatus 200 predicts the occurrence of the target speech having the predetermined context using the prediction model (Step S8). For example, the output apparatus 200 outputs a probability that the target speech "090-XXXX-XXXX" having the predetermined context will be uttered by inputting a voice indicated by "Yesterday, my friend A called me on my telephone number" as the pre-speech to the prediction model. Then, the output apparatus 200 determines that the target speech having the predetermined context is uttered by the user U1 in a case where the probability that the target speech having the predetermined context will be uttered is equal to or greater than a predetermined threshold value.

Then, the output apparatus 200 outputs the voice having the opposite phase in a case where the occurrence of the target speech having the predetermined context has been predicted (Step S9). For example, in a case where it has been determined that the target speech "090-XXXX-XXXX" is uttered by the user U1, the information processing device 100 outputs waveform information having the opposite phase to the voice indicated by the target speech "090-XXXX-XXXX" having the predetermined context to the user U1. Therefore, the output apparatus 200 can selectively remove a voice corresponding to the target speech having the predetermined context in the voice uttered by the user U1.

As such, the output apparatus 200 acquires information of a real world (reality) detected by various sensors as detection information, and constructs a detection world (sensed reality) from the acquired detection information. Then, the output apparatus 200 provides the user with a diminished world (diminished reality) in which a target satisfying a predetermined condition, such as the waveform information having the predetermined context among various targets (corresponding to targets in the real world) included in the detection world is erased or changed or the ease of recognition of the target is diminished, by various providing means. As a result, the output apparatus 200 can exclude information that the user does not want to recognize or the output apparatus 200 does not want the user to recognize from a recognition target of the user.

Conventionally, there was a case where it is difficult to appropriately remove a voice that needs to be removed in consideration of the privacy of the user in a voice output by the smart speaker. Therefore, the output apparatus 200 according to the embodiment solves a conventional problem by predicting whether or not the waveform information having the predetermined context will be generated on the basis of detection information detected by a predetermined detection device and outputting waveform information having an opposite phase to the waveform information having the predetermined context in a case where it has been predicted that the waveform information having the predetermined context will be generated. Therefore, the output apparatus 200 can appropriately protect the privacy of the user.

2. Specific Example of Prediction Processing Based on Context

The prediction processing in which the output apparatus 200 according to the embodiment predicts whether or not the waveform information having the predetermined context will be generated on the basis of the detection information detected by the predetermined detection device has been described in the above embodiment, but the output apparatus 200 may perform prediction processing as described below. Note that the context mentioned herein includes, for example, an attribute of the user, a position of the user, the date and time when the user has uttered, a state indicating an emotion or the like of the user, an action that the user will take, a congestion degree indicating a degree of congestion in a case where users have gathered in a predetermined area, or the like.

Specifically, the output apparatus 200 predicts whether or not the waveform information having the predetermined context will be generated on the basis of time information regarding a time when the detection information has been detected by the predetermined detection device. For example, an example in which a terminal device is used by the user will be described. In this case, in a case where the attribute of the user detected by the terminal device is a male in his thirties, the output apparatus 200 outputs a probability that the target speech "090-XXXX-XXXX" having the predetermined context will be uttered by inputting the voice indicated by "Yesterday, my friend A called me on my telephone number" as a pre-speech to the prediction model. Then, the output apparatus 200 determines that the target speech having the predetermined context is uttered by the user in a case where the probability that the target speech having the predetermined context will be uttered is equal to or greater than a predetermined threshold value. On the other hand, in a case where the attribute of the detected user is a female in her twenties, the output apparatus 200 determines that the target speech having the predetermined context is not uttered by the user because the probability that the target speech having the predetermined context will be uttered is less than the predetermined threshold value.

In addition, the output apparatus 200 predicts whether or not the waveform information having the predetermined context will be generated on the basis of the time information regarding the time when the detection information has been detected by the predetermined detection device. For example, in a case where the date and time detected by a sensor or the like that measures a time is in the morning, the output apparatus 200 outputs a probability that the target speech "090-XXXX-XXXX" having the predetermined context will be uttered by inputting the voice indicated by "Yesterday, my friend A called me on my telephone number" as the pre-speech to the prediction model. Then, the output apparatus 200 determines that the target speech having the predetermined context is uttered by the user in a case where the probability that the target speech having the predetermined context will be uttered is equal to or greater than a predetermined threshold value. On the other hand, in a case where the detected date and time is in the evening, the output apparatus 200 determines that the target speech having the predetermined context is not uttered by the user because the probability that the target speech having the predetermined context will be uttered is less than the predetermined threshold value.

In addition, the output apparatus 200 may predict whether or not the waveform information having the predetermined context will be generated on the basis of a position indicated by the predetermined detection device when the detection information has been detected by the predetermined detection device. For example, an example in which a terminal device is used by the user will be described. In addition, it is assumed that a position where the user U1 has made an utterance to the user U2 in the past and a position where the user U1 has made an utterance to the user U3 at the present are similar to each other. In this case, in a case where a position detected by a global positioning system (GPS) sensor or the like provided in the terminal device is a position of a school, the output apparatus 200 outputs a probability that the target speech "090-XXXX-XXXX" having the predetermined context will be uttered by inputting the voice indicated by "Yesterday, my friend A called me on my telephone number" as the pre-speech uttered by the user U1 to the prediction model. Then, the output apparatus 200 determines that the target speech having the predetermined context is uttered by the user U1 in a case where the probability that the target speech having the predetermined context will be uttered is equal to or greater than a predetermined threshold value. On the other hand, in a case where the detected position is a position of a park, the output apparatus 200 determines that the target speech having the predetermined context is not uttered by the user U1 in a case where the probability that the target speech having the predetermined context will be uttered is less than the predetermined threshold value.

In addition, the output apparatus 200 may predict whether or not the waveform information having the predetermined context will be generated on the basis of weather information regarding weather when the detection information has been detected in the past by the predetermined detection device. For example, it is assumed that weather information regarding the weather when the user U1 has made an utterance to the user U2 in the past and weather information regarding weather when the user U1 has made an utterance to the user U3 at the present are similar to each other. In this case, the output apparatus 200 outputs a probability that the target speech "090-XXXX-XXXX" having the predetermined context will be uttered by inputting the voice indicated by "Yesterday, my friend A called me on my telephone number" as the pre-speech uttered by the user U1 to the prediction model. Then, the output apparatus 200 determines that the target speech is uttered by the user U1 in a case where the probability that the target speech having the predetermined context will be uttered is equal to or greater than a predetermined threshold value.

In addition, the output apparatus 200 may predict whether or not the waveform information having the predetermined context will be generated on the basis of a speech content having the predetermined context obtained by analyzing the past detection information detected by the predetermined detection device. For example, it is assumed that a speech content indicated by the pre-speech and a speech content indicated by the target speech having the predetermined context are analyzed using a conventional technology such as a morpheme analysis, a syntax analysis, or a semantic analysis. In this case, the output apparatus 200 outputs a probability that the target speech "090-XXXX-XXXX" having the predetermined context will be uttered by inputting the "telephone number" as the speech content indicated by the pre-speech to the prediction model. Then, the output apparatus 200 determines that the target speech is uttered by the user in a case where the probability that the target speech having the predetermined context will be uttered is equal to or greater than a predetermined threshold value.

In addition, the output apparatus 200 may predict whether or not the waveform information having the predetermined context will be generated on the basis of the detection information detected by the predetermined detection device in the past. For example, it is assumed that the output apparatus 200 is provided with a database in which pre-speeches acquired in advance from each user and target speeches having predetermined contexts are stored in association with each other. In this case, the output apparatus 200 acquires a pre-speech uttered by the user, and searches for a target speech having a predetermined context associated with the pre-speech with reference to the database. For example, the output apparatus 200 specifies the pre-speech uttered by the user on the basis of a similarity between first waveform information indicated by the pre-speech uttered by the user and second waveform information indicated by the pre-speech stored in the database using a conventional technology such as a voice analysis. Then, the output apparatus 200 predicts that a target speech having a predetermined context associated with the specified pre-speech is a target speech having a predetermined context corresponding to the pre-speech uttered by the user. As such, the output apparatus 200 can determine that the target speech having the predetermined context occurs.

For example, an in-vehicle announcement in a train will be described by way of example. In this case, the output apparatus 200 detects a sound and a voice that accord with a predetermined policy among outside sounds and voices (for example, a broadcast in a station yard, a sound of a propaganda vehicle, a broadcast regarding an advertisement) heard in a first vehicle. Then, the output apparatus 200 causes passengers not to hear the detected sound and voice by outputting a sound and a voice having an opposite phase in second and subsequent vehicles. In addition, in a case where a broadcast is played in a station yard positioned near a tunnel on a railroad track where the train runs, the output apparatus 200 may emphasize an in-vehicle broadcast by canceling the broadcast in the station yard with a sound having an opposite phase.

In addition, a station where an announcement or the like is broadcast, a position of the station, and a time when the announcement or the like is broadcast may be stored in the database in advance in association with each other. For example, it is assumed that the terminal device is used by the user. In this case, in a case where a position of the user detected by the GPS sensor or the like provided in the terminal device is inside the train and a time when the position was acquired is "13:45", the output apparatus 200 refers to a database in which an announcement to be broadcast when the train passes through "A station" after five minutes (passing time is "13:50") is stored. Then, in a case where the position of the user and the "A station" are within a predetermined distance and a time is the passing time "13:50", the output apparatus 200 may cancel the announcement to be broadcast at the "A station" by a voice having an opposite phase corresponding to the announcement to be broadcast at the "A station" stored in the database.

Note that a description has been provided for the train in the above example, but may be applied to any moving body instead of the train. For example, the moving body is a private car, an automobile including a taxi, a bus or the like, an airplane, or the like.

In addition, the output apparatus 200 may predict whether or not the waveform information having the predetermined context will be generated on the basis of a context of the user when he/she has uttered a speech indicated by the waveform information having the predetermined context rather than a content itself of the speech. For example, in a case where the user is traveling, the output apparatus 200 outputs a probability that the target speech "090-XXXX-XXXX" will be uttered by inputting a voice indicated by "Yesterday, my friend A called me on my telephone number" as the pre-speech to the prediction model. Then, the output apparatus 200 determines that the target speech is uttered by the user in a case where the probability that the target speech will be uttered is equal to or greater than a predetermined threshold value. On the other hand, in a case where the user is not traveling, the output apparatus 200 determines that the target speech is not uttered by the user in a case where the probability that the target speech will be uttered is less than the predetermined threshold value.

For example, in a case where the user U1 and the user U2 are family members, the output apparatus 200 outputs a probability that the target speech "090-XXXX-XXXX" will be uttered by inputting the voice indicated by "Yesterday, my friend A called me on my telephone number" as the pre-speech uttered by the user U1 to the prediction model. Then, the output apparatus 200 determines that the target speech is uttered by the user U1 in a case where the probability that the target speech will be uttered is equal to or greater than a predetermined threshold value. On the other hand, in a case where the user U1 and the user U2 are friends, the output apparatus 200 determines that the target speech is not uttered by the user U1 in a case where the probability that the target speech will be uttered is less than the predetermined threshold value.

In addition, in a case where predetermined waveform information indicated by a voice that the user has uttered in a predetermined state has been detected by the predetermined detection device in the past as a context estimated on the basis of the detection information, the output apparatus 200 predicts whether or not the predetermined waveform information will be generated. For example, the output apparatus 200 predicts whether or not the predetermined waveform information will be generated on the basis of an emotion of the user who has uttered the voice as the context estimated on the basis of the detection information.

Here, for example, in a case where an amplitude indicated by the voice of the user is equal to or greater than a predetermined threshold value, the output apparatus 200 estimates that the user is angry as the emotion of the user. On the other hand, in a case where the amplitude indicated by the voice of the user is less than the predetermined threshold value, the output apparatus 200 estimates that the user is calm as the emotion of the user. In addition, in a case where a speed of the speech uttered by the user is equal to or greater than a predetermined threshold value, the output apparatus 200 estimates that the user is angry as the emotion of the user. On the other hand, in a case where the speed of the speech uttered by the user is less than the predetermined threshold value, the output apparatus 200 estimates that the user is calm as the emotion of the user.

For example, it is assumed that an emotion of the user U1 in the past and an emotion of the user U1 at the present are similar to each other. In this case, the output apparatus 200 outputs a probability that the target speech "090-XXXX- XXXX" will be uttered by inputting the voice indicated by "Yesterday, my friend A called me on my telephone number" as the pre-speech to a prediction model 221. Then, the output apparatus 200 determines that the target speech is uttered by the user U1 in a case where the probability that the target speech will be uttered is equal to or greater than a predetermined threshold value.

As such, the output apparatus 200 may predict generation of waveform information in which a context regarding an output source or an output destination of the waveform information and a context of a generation mode such as the date and time or a place when the waveform information has been generated as well as a context of the waveform information itself satisfy predetermined conditions, and output information having an opposite phase in a case where the generation of the waveform information has been predicted.

2. Configuration of Output System

Figure 2:
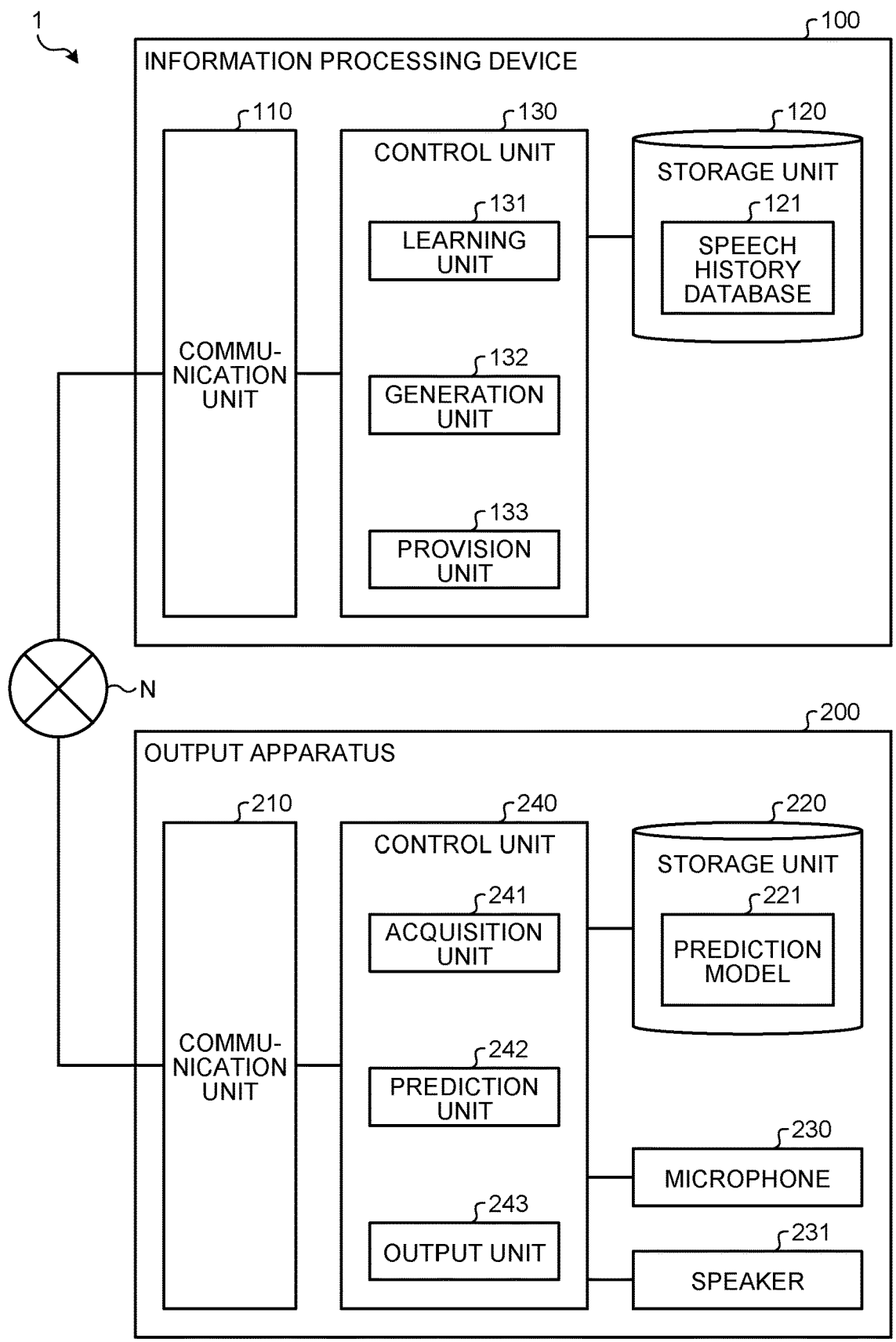
FIG. 2 is a diagram illustrating a configuration example of an output system according to the embodiment.

As illustrated in FIG. 2, an output system 1 includes an information processing device 100 and an output apparatus 200. The information processing device 100 and the output apparatus 200 are communicably connected to each other in a wired or wireless manner via a network N. Note that the output system 1 illustrated in FIG. 2 may include a plurality of information processing devices 100 or a plurality of output apparatuses 200.

The information processing device 100 according to the embodiment is an information processing device capable of communicating with various devices via a predetermined network N such as the Internet, and is realized by, for example, a server device, a cloud system or the like. For example, the information processing device 100 is communicably connected to various other devices via the network N.

The output apparatus 200 according to the embodiment is an information processing device having a voice recognition function, a voice reproduction function, a voice synthesis function, a voice response function, and the like, and is, for example, a smart speaker or the like. In addition, the output apparatus 200 is communicably connected to various other devices via the network N.

In addition, the output apparatus 200 is a device that can realize output of music or provision of information by a voice. In addition, the output apparatus 200 has an acquisition function of acquiring a sound, and has an output function of outputting a sound according to a content of an acquired voice when a voice uttered by the user is acquired.

3. Configuration of Information Processing Device

Hereinafter, an example of a functional configuration of the information processing device 100 described above will be described. FIG. 2 is a diagram illustrating a configuration example of the information processing device 100 according to the embodiment. As illustrated in FIG. 2, the information processing device 100 includes a communication unit 110, a storage unit 120, and a control unit 130.

Communication Unit 110

The communication unit 110 is realized by, for example, a network interface card (NIC) or the like. Then, the communication unit 110 is connected to the network N in a wired or wireless manner, and transmits and receives information to and from the output apparatus 200.

Storage Unit 120

The storage unit 120 is realized by, for example, a semiconductor memory element such as a random access memory (RAM), a flash memory or the like, or a storage device such as a hard disk, an optical disk or the like. In addition, the storage unit 120 has a speech history database 121.

Speech History Database 121

Figures 3, 4:
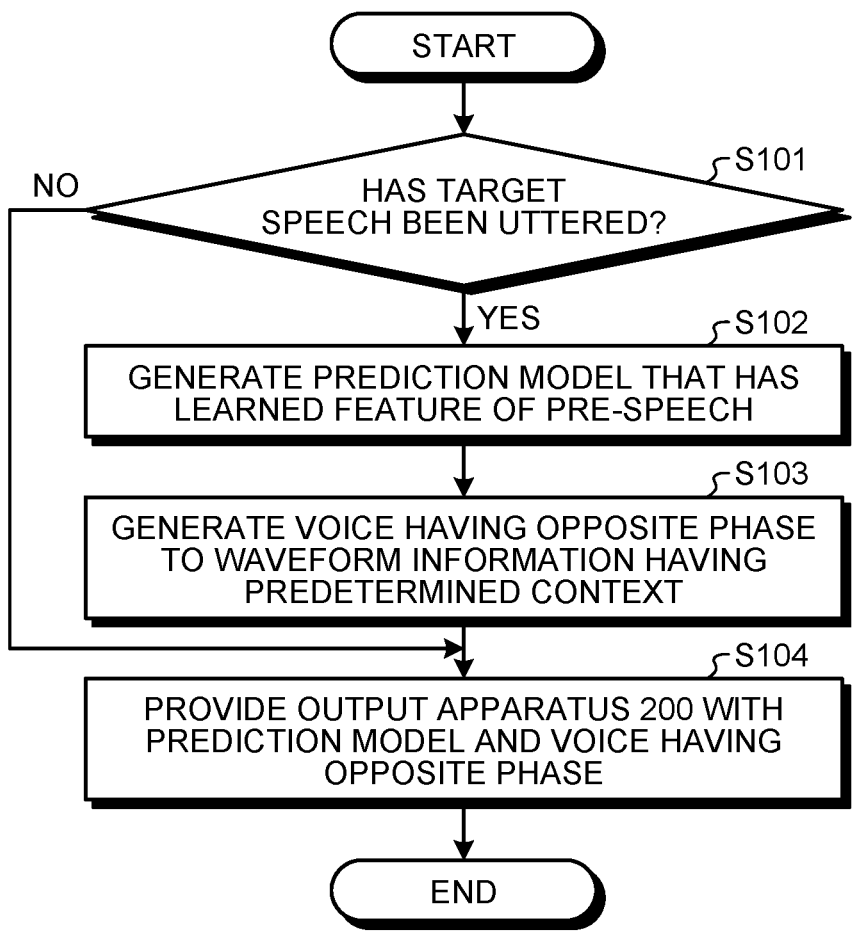
FIG. 3 is a diagram illustrating an example of a speech history database according to the embodiment.
FIG. 4 is a flowchart illustrating an example of a flow of information processing executed by an information processing device according to the embodiment.

The speech history database 121 stores voice information regarding a speech uttered by the user. Here, FIG. 3 illustrates an example of the speech history database 121 according to the embodiment. In the example illustrated in FIG. 3, the speech history database 121 has items such as a "speech history identifier (ID)", a "target speech", and a "pre-speech".

The "speech history ID" is an identifier that identifies a speech history. The "target speech" is information regarding a target speech to be predicted, associated with the "speech history ID". For example, the target speech is waveform information indicated by a voice of the target speech to be predicted, and is waveform information or the like having a predetermined context. The "pre-speech" is information regarding a speech uttered before the target speech associated with the "speech history ID". For example, the pre-speech is waveform information or the like indicated by a voice of the speech uttered before the target speech.

For example, in FIG. 3, in "RE1" identified by the speech history ID, the target speech is "target speech #1" and the pre-speech is "pre-speech #1". Note that the target speech and the pre-speech have been represented by abstract codes in the example illustrated in FIG. 3, but the target speech and the pre-speech may be specific numerical values, specific file formats or the like. In addition, the speech history database 121 may store not only the above items but also feature information indicating a feature of the speech uttered by the user, or the like.

Control Unit 130

The control unit 130 is a controller, and is realized by, for example, executing various programs stored in a storage device in the information processing device 100 using a RAM as a work area by a central processing unit (CPU), a micro processing unit (MPU), or the like. In addition, the control unit 130 is a controller, and is realized by, for example, an integrated circuit such as an application specific integrated circuit (ASIC), a field programmable gate array (FPGA) or the like.

As illustrated in FIG. 2, the control unit 130 includes a learning unit 131, a generation unit 132, and a provision unit 133, and realizes or executes functions or actions of information processing to be described below. Note that an internal configuration of the control unit 130 is not limited to a configuration illustrated in FIG. 2, and may be another configuration as long as it is a configuration for performing information processing to be described later. In addition, a connection relationship between respective processing units included in the control unit 130 is not limited to a connection relationship illustrated in FIG. 2, and may be another connection relationship.

Learning Unit 131

The learning unit 131 generates a learning model using various information. Specifically, the learning unit 131 generates a prediction model that predicts the occurrence of the target speech having the predetermined context from the pre-speech with reference to the speech history database 121. For example, the learning unit 131 generates a prediction model that outputs a probability that the target speech having the predetermined context will be uttered in a case where the waveform information of the voice indicated by the pre-speech has been input, by learning the waveform information of the voice indicated by the pre-speech and the waveform information of the voice indicated by the target speech having the predetermined context using a conventional technology such as machine learning.

In addition, the learning unit 131 may generate a prediction model that outputs a probability that the target speech having the predetermined context will be uttered in a case where the waveform information of the voice indicated by the pre-speech and time information regarding a time when an utterance has been made have been input, by learning the waveform information of the voice indicated by the pre-speech, the waveform information of the voice indicated by the target speech having the predetermined context, and the time information regarding the time when the utterance has been made.

In addition, the learning unit 131 may generate a prediction model that outputs a probability that the target speech having the predetermined context will be uttered in a case where the waveform information of the voice indicated by the pre-speech and a position of the user who has made an utterance have been input by learning the waveform information of the voice indicated by the pre-speech, the waveform information of the voice indicated by the target speech having the predetermined context, and the position of the user who has made the utterance.

In addition, the learning unit 131 may generate a prediction model that outputs a probability that the target speech having the predetermined context will be uttered in a case where the waveform information of the voice indicated by the pre-speech and weather information regarding weather when an utterance has been made have been input, by learning the waveform information of the voice indicated by the pre-speech, the waveform information of the voice indicated by the target speech having the predetermined context, and the weather information regarding the weather when the utterance has been made.

In addition, the learning unit 131 may cause a predetermined learning model to learn various information. Specifically, the learning unit 131 may cause the prediction model that outputs the probability that the target speech having the predetermined context will be uttered in a case where the waveform information of the voice indicated by the pre-speech has been input to learn waveform information of a voice indicated by a newly acquired pre-speech and waveform information of a voice indicated by a newly acquired target speech having a predetermined context with reference to the speech history database 121.

Note that the prediction model in the embodiment is not limited to the above example. For example, the learning unit 131 may generate a prediction model by learning a speech content indicated by the voice instead of the waveform information of the voice.

For example, the learning unit 131 estimates a speech content indicated by the pre-speech by analyzing the speech content indicated by the pre-speech using a conventional technology such as a morpheme analysis, a syntax analysis, or a semantic analysis. In addition, the learning unit 131 estimates a speech content indicated by the target speech having the predetermined context by analyzing the speech content indicated by the target speech having the predetermined context using the conventional technology such as the morpheme analysis, the syntax analysis, or the semantic analysis. Then, the learning unit 131 may generate a prediction model that outputs a probability that the target speech having the predetermined context will be uttered in a case where the speech content indicated by the pre-speech has been input, by learning the speech content indicated by the pre-speech and the speech content indicated by the target speech having the predetermined context. Note that the learning unit 131 does not need to be limited to processing for generating the prediction model that outputs the probability that the target speech will be uttered, and may generate, for example, a prediction model that outputs the speech content indicated by the target speech having the predetermined context.

Generation Unit 132

The generation unit 132 generates various information. Specifically, the generation unit 132 generates waveform information having the opposite phase that cancels the waveform information of the voice indicated by the target speech having the predetermined context in order to remove the target speech having the predetermined context. For example, the generation unit 132 generates waveform information having the opposite phase from the waveform information of the voice indicated by the target speech "090-XXXX-XXXX" having the predetermined context by a conventional technology used for noise cancellation or the like.

Provision Unit 133

The provision unit 133 provides various information. Specifically, the provision unit 133 provides the output apparatus 200 with the prediction model and the voice having the opposite phase. For example, in a case where the waveform information of the voice indicated by the pre-speech has been input, the provision unit 133 provides the output apparatus 200 with the prediction model that outputs a probability that the target speech having the predetermined context will be uttered and the waveform information having the opposite phase to the voice indicated by the target speech "090-XXXX-XXXX" having the predetermined context.

4. Configuration of Output Apparatus

Hereinafter, an example of a functional configuration of the output apparatus 200 described above will be described. FIG. 2 is a diagram illustrating a configuration example of the output apparatus 200 according to the embodiment. As illustrated in FIG. 2, the output apparatus 200 includes a communication unit 210, a storage unit 220, a microphone 230, a speaker 231 and a control unit 240.

Communication Unit 210

The communication unit 210 is realized by, for example, a NIC or the like. Then, the communication unit 210 is connected to the network N in a wired or wireless manner, and transmits and receives information to and from the information processing device 100.

Storage Unit 220

The storage unit 220 is realized by, for example, a semiconductor memory element such as a RAM, a flash memory, or the like, or a storage device such as a hard disk, an optical disk or the like. In addition, the storage unit 220 has a prediction model 221. For example, the prediction model 221 is a prediction model that outputs the probability that the target speech will be uttered in a case where the waveform information of the voice indicated by the pre-speech has been input.

Microphone 230

The microphone 230 acquires various sounds and voices. For example, the microphone 230 acquires an ambient sound. In addition, the microphone 230 acquires a voice uttered by the user positioned in the surrounding.

Speaker 231

The speaker 231 outputs various sounds and voices. For example, the speaker 231 outputs an arbitrary sound and voice. In addition, the speaker 231 outputs a voice having an opposite phase.

Control Unit 240

The control unit 240 is a controller, and is realized by, for example, executing various programs (corresponding to an example of an output program) stored in a storage device in the output apparatus 200 using a RAM as a work area by a CPU, an MPU, or the like. In addition, the control unit 240 is a controller, and is realized by an integrated circuit such as an ASIC, an FPGA or the like.

As illustrated in FIG. 2, the control unit 240 includes an acquisition unit 241, a prediction unit 242, and an output unit 243, and realizes or executes functions or actions of information processing to be described below. Note that an internal configuration of the control unit 240 is not limited to a configuration illustrated in FIG. 2, and may be another configuration as long as it is a configuration for performing information processing to be described later. In addition, a connection relationship between respective processing units included in the control unit 240 is not limited to a connection relationship illustrated in FIG. 2, and may be another connection relationship.

Acquisition Unit 241

The acquisition unit 241 acquires various information. Specifically, the acquisition unit 241 acquires the pre-speech prior to the target speech having the predetermined context from the user U1 when the user U1 has made an utterance to the user U2. Then, the acquisition unit 241 acquires a speech of the user in a case where a predetermined time has elapsed from a time when the user U1 has made an utterance to the user U2.

For example, the acquisition unit 241 acquires the waveform information of the voice indicated by "Yesterday, my friend A called me on my telephone number" with "Yesterday, my friend A called me on my telephone number" positioned in front of the target speech "090-XXXX-XXXX" having the predetermined context as the pre-speech.

For example, the acquisition unit 241 acquires the voice indicated by the speech such as "Yesterday, my friend A called me on my telephone number . . . " as the speech of the user U1 to the user U3. In this case, the output apparatus 200 acquires waveform information of a voice indicating "Yesterday, my friend A called me on my telephone number . . . ".

Prediction Unit 242

The prediction unit 242 predicts various information. Specifically, the prediction unit 242 predicts whether or not the waveform information having the predetermined context will be generated on the basis of the detection information detected by the predetermined detection device.

For example, it is assumed that the user U1 has made an utterance to the user U3 in a case where a predetermined time has elapsed from a time when the user U1 has made an utterance to the user U2. In this case, the prediction unit 242 outputs a probability that the target speech "090-XXXX-XXXX" having the predetermined context will be uttered by inputting the voice indicated by "Yesterday, my friend A called me on my telephone number" as the pre-speech to the prediction model 221, on the basis of the date and time detected by a sensor or the like that measures a time. Then, the prediction unit 242 determines that the target speech having the predetermined context is uttered by the user U1 in a case where the probability that the target speech having the predetermined context will be uttered is equal to or greater than a predetermined threshold value.

Output Unit 243

The output unit 243 outputs various information. Specifically, the output unit 243 outputs the waveform information having the opposite phase to the waveform information having the predetermined context in a case where it has been predicted that the waveform information having the predetermined context will be generated. For example, in a case where it has been determined that the target speech "090-XXXX-XXXX" having the predetermined context is uttered by the user U1, the output unit 243 outputs the waveform information having the opposite phase to the voice indicated by the target speech "090-XXXX-XXXX" having the predetermined context to the user U1. Therefore, the output unit 243 can selectively remove the voice corresponding to the target speech having the predetermined context in the voice uttered by the user U1.

For example, an in-vehicle announcement in a train will be described by way of example. In this case, the output unit 243 outputs a sound having an opposite phase to waveform information indicated by a broadcast in the station yard into the train so as to reduce the broadcast played in the station yard in a case where the train has entered the station. Therefore, the output unit 243 can reduce the broadcast played in the station yard and emphasize an in-vehicle broadcast.

5. Processing Procedure (1)

Next, a procedure of information processing executed by the information processing device 100 according to the embodiment will be described with reference to FIG. 4. FIG. 4 is a flowchart illustrating an example of a flow of information processing executed by the information processing device 100 according to the embodiment.

As illustrated in FIG. 4, the learning unit 131 determines whether or not the target speech has been uttered (Step S101). Specifically, in a case where the learning unit 131 has determined that the target speech has not been uttered (Step S101: No), the learning unit 131 proceeds to Step S104.

On the other hand, in a case where the learning unit 131 has determined that the target speech has been uttered (Step S101: Yes), the learning unit 131 generates a prediction model that has learned a feature of the pre-speech (Step S102). Then, the generation unit 132 generates a voice having an opposite phase to the waveform information having the predetermined context (Step S103). Then, the provision unit 133 provides the output apparatus 200 with the prediction model and the voice having the opposite phase (Step S104).

6. Processing Procedure (2)

Figure 5:
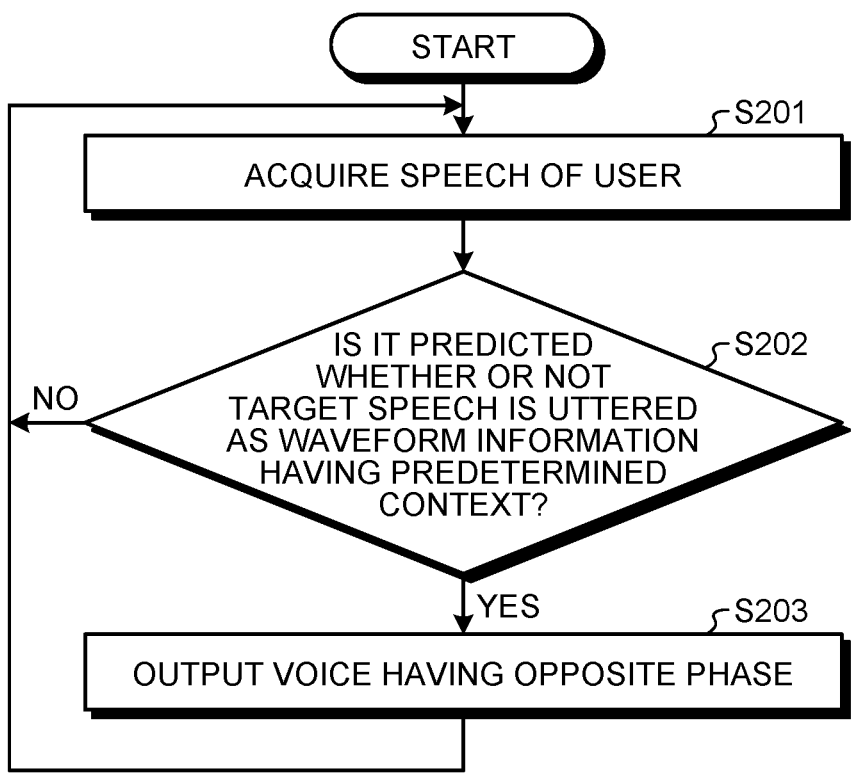
FIG. 5 is a flowchart illustrating an example of a flow of output processing executed by the output apparatus according to the embodiment.

Next, a procedure of output processing executed by the output apparatus 200 according to the embodiment will be described with reference to FIG. 5. FIG. 5 is a flowchart illustrating an example of a flow of output processing executed by the output apparatus 200 according to the embodiment.

As illustrated in FIG. 5, the acquisition unit 241 acquires a speech of the user (Step S201). Then, the prediction unit 242 predicts whether or not the target speech will be uttered as the waveform information having the predetermined context (Step S202). Specifically, in a case where the prediction unit 242 has predicted that the target speech will not be uttered (Step S202: No), the prediction unit 242 returns to a step before Step S201.

On the other hand, in a case where the prediction unit 242 has predicted that the target speech will be uttered (Step S202: Yes), the output unit 243 outputs a voice having an opposite phase (Step S203). Then, the output unit 243 returns to a step before Step S201 and repeats the above processing.

7. Modification

The information processing device 100 and the output apparatus 200 described above may be implemented in various different forms other than the above embodiment. Therefore, other embodiments of the information processing device 100 and the output apparatus 200 will hereinafter be described.

7-1. Voice

The voice indicated by the speech uttered by the user has been described by way of example in the above embodiment, but the output processing described in the above embodiment may be applied to, for example, vibrations such as fragrance, light, an electromagnetic wave, and an earthquake, instead of the voice. As such, the above embodiment can be applied to any physical phenomenon as long as it is a physical phenomenon exhibiting periodic fluctuations.

7-2. Target Speech

An example in which the personal information that can specify the user is uttered and the speech corresponding to the personal information is the target speech has been described in the above embodiment, but the present invention is not limited thereto. The output processing described in the above embodiment may be applied to, for example, personal information of another user or a speech corresponding to a content that insults or discriminates another user. In addition, the output processing described in the above embodiment may be applied to a user's habit of saying.

7-3. Output Direction

An example in which the output apparatus 200 outputs the waveform information having the opposite phase to the waveform information having the predetermined context in a case where it has been predicted that the waveform information having the predetermined context will be generated has been described in the above embodiment, but the present invention is not limited thereto. For example, the output apparatus 200 may limit a direction in which it outputs the voice having the opposite phase. In this case, the output apparatus 200 may output the voice having the opposite phase only in a direction in which the user utters the target speech. Note that the voice having the opposite phase may have a directivity.

For example, it is assumed that a propaganda vehicle is running while outputting a sound in a large volume toward the surrounding. In this case, the output apparatus 200 may output a sound having an opposite phase in order to prevent the sound output from the propaganda vehicle from reaching a predetermined area to cancel the sound output from the propaganda vehicle. Note that the output apparatus 200 may be used in a case where a request or a contract for reducing the sound of the propaganda vehicle from the predetermined area is made.

7-4. Output Apparatus

The output apparatus 200 has been described as an example of the smart speaker in the above embodiment, but the output apparatus 200 may be any information processing device as long as it has a voice reproduction function. Specifically, the output apparatus 200 may be a terminal device used by a user who accesses a content such as a web page displayed on a browser or a content for an application.

For example, the output apparatus 200 may be a desktop personal computer (PC), a notebook PC, a tablet terminal, a mobile phone, a personal digital assistant (PDA), a smartwatch, a wearable device, or the like. For example, the output apparatus 200 may be provided with a movable pulley or the like to self-travel.

7-5. Program

Figure 6:
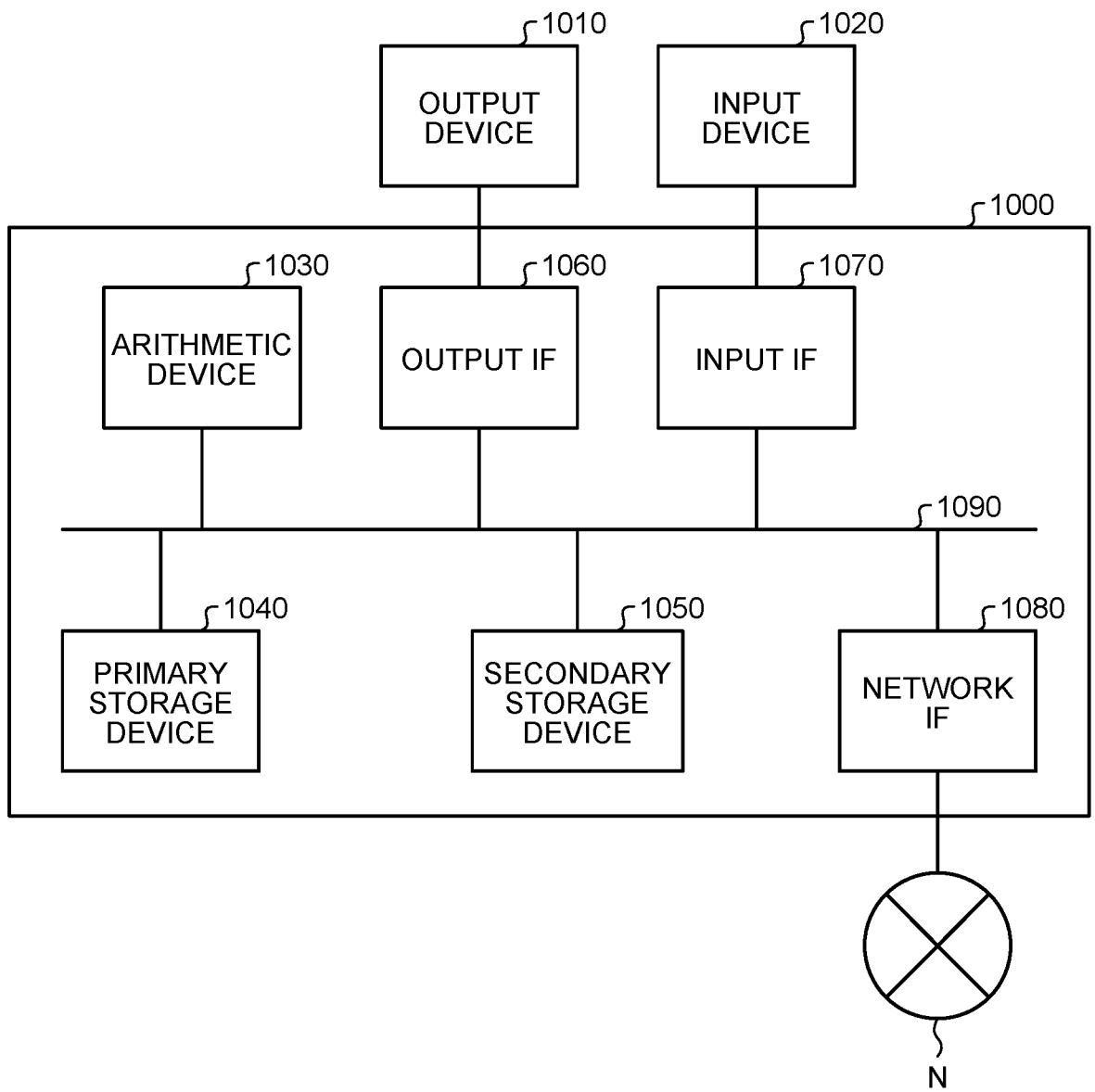
FIG. 6 is a hardware configuration diagram illustrating an example of a computer that realizes a function of the output apparatus.

In addition, the output apparatus 200 according to the embodiment described above is realized by, for example, a computer 1000 having a configuration as illustrated in FIG. 6. FIG. 6 is a diagram illustrating an example of a hardware configuration. The computer 1000 is connected to an output apparatus 1010 and an input device 1020, and has a form in which an arithmetic device 1030, a primary storage device 1040, a secondary storage device 1050, an output interface (IF) 1060, an input IF 1070, and a network IF 1080 are connected to each other by a bus 1090.

The arithmetic device 1030 operates on the basis of a program stored in the primary storage device 1040 or the secondary storage device 1050, a program read from the input device 1020, or the like, and executes various processing. The primary storage device 1040 is a memory device that primarily stores data used by the arithmetic device 1030 for various calculations, such as a RAM. In addition, the secondary storage device 1050 is a storage device in which data used by the arithmetic device 1030 for various calculations or various databases are registered, and is realized by, a read only memory (ROM), a hard disk drive (HDD), a flash memory, or the like.

The output IF 1060 is an interface for transmitting target information to be output to the output apparatus 1010 that outputs various information, such as a monitor and a printer, and is realized by, for example, a connector of a standard such as a universal serial bus (USB), a digital visual interface (DVI), and a high definition multimedia interface (HDMI) (registered trademark). In addition, the input IF 1070 is an interface for receiving information from various input devices 1020 such as a mouse, a keyboard, and a scanner, and is realized by, for example, a USB.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like. In addition, the input device 1020 may be an external storage medium such as a USB memory.

The network IF 1080 receives data from another apparatus via the network N and sends the received data to the arithmetic device 1030, and also transmits data generated by the arithmetic device 1030 to another device via the network N.

The arithmetic device 1030 controls the output apparatus 1010 or the input device 1020 via the output IF 1060 or the input IF 1070. For example, the arithmetic device 1030 loads a program from the input device 1020 or the secondary storage device 1050 onto the primary storage device 1040, and executes the loaded program.

For example, in a case where the computer 1000 functions as the output apparatus 200, the arithmetic device 1030 of the computer 1000 realizes a function of the control unit 40 by executing the program loaded onto the primary storage device 1040.

7-6. Others

In addition, all or some of the processing described as being automatically performed among the respective processing described in the embodiment and the modification described above can be manually performed or all or some of the processing described as being manually performed among the respective processing described in the embodiment and the modification described above can be automatically performed by a known method. In addition, processing procedures, specific names, and information including various data or parameters illustrated in the above document or the drawings can be arbitrarily changed unless otherwise specified. For example, various information illustrated in each drawing is not limited to the illustrated information.

In addition, each component of the respective devices that are illustrated is a functional concept, and does not necessarily have to be physically configured as illustrated. That is, specific forms of distribution and integration of the respective devices are not limited to those illustrated, and all or some of the devices can be configured to be functionally or physically distributed and integrated in any unit according to various loads, use situations or the like. For example, the information processing device 100 and the output apparatus 200 may be integrated with each other to configure an output apparatus.

In addition, the embodiment and the modification described above can be appropriately combined with each other within as long as processing contents do not contradict each other.

In addition, the "unit" described above can be replaced with a "means" or a "circuit". For example, the output unit can be replaced with an output means or an output circuit.

8. Effect

As described above, the output apparatus 200 according to the embodiment includes the prediction unit 242 and the output unit 243. The prediction unit 242 predicts whether or not the waveform information having the predetermined context will be generated on the basis of the detection information detected by the predetermined detection device. The output unit 243 outputs the waveform information having the opposite phase to the waveform information having the predetermined context in a case where it has been predicted that the waveform information having the predetermined context will be generated.

Therefore, the output apparatus 200 according to the embodiment outputs the waveform information having the opposite phase to the waveform information having the predetermined context in a case where it has been predicted that the waveform information having the predetermined context will be generated, and can thus remove appropriately the predetermined waveform information.

In addition, in the output apparatus 200 according to the embodiment, the prediction unit 242 predicts whether or not waveform information having a predetermined waveform will be generated as the waveform information having the predetermined context.

Therefore, the output apparatus 200 according to the embodiment predicts whether or not the waveform information having the predetermined waveform will be generated as the waveform information having the predetermined context, and can thus remove appropriately the predetermined waveform information.

In addition, in the output apparatus 200 according to the embodiment, the prediction unit 242 predicts whether or not the waveform information having the predetermined context will be generated on the basis of the position indicated by the predetermined detection device when the detection information has been detected by the predetermined detection device, and the output unit 243 outputs the waveform information having the opposite phase to the waveform information having the predetermined context in a direction in which the waveform information having the predetermined context has been detected in the past in a case where the position where the detection information has been detected by the predetermined detection device is similar to a position where the waveform information having the predetermined context has been detected in the past.

Therefore, the output apparatus 200 according to the embodiment outputs the waveform information having the opposite phase to the waveform information having the predetermined context in the direction in which the waveform information having the predetermined context has been detected in the past in a case where the position where the detection information has been detected by the predetermined detection device is similar to the position where the waveform information having the predetermined context has been detected in the past, and can thus remove appropriately the predetermined waveform information.

In addition, in the output apparatus 200 according to the embodiment, the prediction unit 242 predicts whether or not the waveform information having the predetermined context will be generated on the basis of the time information regarding the time when the detection information has been detected by the predetermined detection device, and the output unit 243 outputs the waveform information having the opposite phase to the waveform information having the predetermined context in a case where the time information regarding the time when the detection information has been detected by the predetermined detection device is similar to time information regarding a time when the waveform information having the predetermined context has been detected in the past.

Therefore, the output apparatus 200 according to the embodiment outputs the waveform information having the opposite phase to the waveform information having the predetermined context in a case where the time information regarding the time when the detection information has been detected by the predetermined detection device is similar to the time information regarding the time when the waveform information having the predetermined context has been detected in the past, and can thus remove appropriately the predetermined waveform information.

In addition, in the output apparatus 200 according to the embodiment, the prediction unit 242 predicts whether or not the waveform information having the predetermined context will be generated on the basis of the weather information regarding the weather when the detection information has been detected in the past by the predetermined detection device, and the output unit 243 outputs the waveform information having the opposite phase to the waveform information having the predetermined context in a case where the weather information regarding the weather when the detection information has been detected by the predetermined detection device is similar to weather information regarding weather when the waveform information having the predetermined context has been detected in the past.

Therefore, the output apparatus 200 according to the embodiment outputs the waveform information having the opposite phase to the waveform information having the predetermined context in a case where the weather information regarding the weather when the detection information has been detected by the predetermined detection device is similar to the weather information regarding the weather when the waveform information having the predetermined context has been detected in the past, and can thus remove appropriately the predetermined waveform information.

In addition, in the output apparatus 200 according to the embodiment, the prediction unit 242 predicts whether or not the waveform information having the predetermined context will be generated on the basis of the context estimated on the basis of the detection information.

Therefore, the output apparatus 200 according to the embodiment predicts whether or not the waveform information having the predetermined context will be generated on the basis of the context estimated on the basis of the detection information, and can thus remove the voice at an appropriate timing.

In addition, in the output apparatus 200 according to the embodiment, the prediction unit 242 predicts whether or not the waveform information having the predetermined context will be generated in a case where a state similar to a state of the user detected when the user has uttered the voice having the predetermined context by the predetermined detection device in the past has been detected as the context.

Therefore, the output apparatus 200 according to the embodiment predicts whether or not the waveform information having the predetermined context will be generated in a case where the state similar to the state of the user detected when the user has uttered the voice having the predetermined context by the predetermined detection device in the past has been detected as the context, and can thus remove the voice at an appropriate timing.

In addition, in the output apparatus 200 according to the embodiment, the prediction unit 242 predicts whether or not the waveform information having the predetermined context will be generated on the basis of the emotion of the user when the user has uttered the voice having the predetermined context.

Therefore, the output apparatus 200 according to the embodiment predicts whether or not the waveform information having the predetermined context will be generated on the basis of the emotion of the user when the user has uttered the voice having the predetermined context, and can thus remove the voice at an appropriate timing.

In addition, in the output apparatus 200 according to the embodiment, the prediction unit 242 predicts whether or not the waveform information having the predetermined context will be generated on the basis of the detection information detected by the predetermined detection device in the past.

Therefore, the output apparatus 200 according to the embodiment predicts whether or not the waveform information having the predetermined context will be generated on the basis of the detection information detected by the predetermined detection device in the past, and can thus remove the voice at an appropriate timing.

In addition, in the output apparatus 200 according to the embodiment, the prediction unit 242 predicts whether or not the predetermined waveform information will be generated on the basis of a similarity between first waveform information based on the detection information detected by the predetermined detection device and another second waveform information that is second waveform information having the predetermined context based on the detection information detected by the predetermined detection device in the past and is different from the first waveform information.

Therefore, the output apparatus 200 according to the embodiment predicts whether or not the predetermined waveform information will be generated on the basis of a similarity between the first waveform information based on the detection information detected by the predetermined detection device and another second waveform information that is the second waveform information having the predetermined context based on the detection information detected by the predetermined detection device in the past and is different from the first waveform information, and can thus remove the voice at an appropriate timing.

Although some of the embodiments of the present application have been described in detail with reference to the drawings hereinabove, these are examples, and it is possible to carry out the present invention in other embodiments in which various modifications and improvements have been made on the basis of knowledge of those skilled in the art, including aspects described in a section of the disclosure of the present invention.

According to one aspect of the embodiment, there is an effect that predetermined waveform information can be appropriately removed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output apparatus comprising:
   a processor configured to predict whether or not waveform information having a predetermined context is generated on a basis of voice detection information detected by a predetermined detection device,
   wherein the processor is configured to:
   output waveform information having an opposite phase to the waveform information having the predetermined context in a case where it has been predicted that the waveform information having the predetermined context is generated;
   predict whether or not the waveform information having the predetermined context is generated on the basis of weather information regarding weather when the detection information has been detected in a past by the predetermined detection device; and
   output the waveform information having the opposite phase to the waveform information having the predetermined context in a case where the weather information regarding the weather when the detection information has been detected by the predetermined detection device is similar to weather information regarding weather when the waveform information having the predetermined context has been detected in the past.

2. The output apparatus according to claim 1, wherein the processor is configured to predict whether or not waveform information having a predetermined waveform is generated as the waveform information having the predetermined context.

3. The output apparatus according to claim 1, wherein the processor is configured to predict whether or not the waveform information having the predetermined context is generated on the basis of a position indicated by the predetermined detection device when the detection information has been detected by the predetermined detection device, and
the processor is configured to output the waveform information having the opposite phase to the waveform information having the predetermined context in a direction in which the waveform information having the predetermined context has been detected in the past in a case where the position where the detection information has been detected by the predetermined detection device is similar to a position where the waveform information having the predetermined context has been detected in the past.

4. The output apparatus according to claim 1, wherein the processor is configured to predict whether or not the waveform information having the predetermined context is generated on the basis of time information regarding a time when the detection information has been detected by the predetermined detection device, and
the processor is configured to output the waveform information having the opposite phase to the waveform information having the predetermined context in a case where the time information regarding the time when the detection information has been detected by the predetermined detection device is similar to time information regarding a time when the waveform information having the predetermined context has been detected in the past.

5. The output apparatus according to of claim 1, wherein the processor is configured to predict whether or not the waveform information having the predetermined context is generated on the basis of a context estimated on the basis of the detection information.

6. The output apparatus according to claim 5, wherein the processor is configured to predict whether or not the waveform information having the predetermined context is generated in a case where a state similar to a state of a user detected when the user has uttered a voice having the predetermined context by the predetermined detection device in the past has been detected as the context.

7. The output apparatus according to claim 6, wherein the processor is configured to predict whether or not the waveform information having the predetermined context is generated on the basis of an emotion of the user when the user has uttered the voice having the context.

8. The output apparatus according to claim 1, wherein the processor is configured to predict whether or not the waveform information having the predetermined context is generated on the basis of the detection information detected by the predetermined detection device in the past.

9. The output apparatus according to claim 8, wherein the processor is configured to predict whether or not the waveform information having the predetermined context is generated on the basis of a similarity between first waveform information based on the detection information detected by the predetermined detection device and another second waveform information that is second waveform information having the predetermined context based on the detection information detected by the predetermined detection device in the past and is different from the first waveform information.

10. An output method executed by a computer, comprising:
a prediction step of predicting whether or not waveform information having a predetermined context is generated on a basis of voice detection information detected by a predetermined detection device; and
an output step of outputting waveform information having an opposite phase to the waveform information having the predetermined context in a case where it has been predicted that the waveform information having the predetermined context is generated,
wherein the prediction step predicts whether or not the waveform information having the predetermined context is generated on the basis of weather information regarding weather when the detection information has been detected in a past by the predetermined detection device, and
wherein the output step outputs the waveform information having the opposite phase to the waveform information having the predetermined context in a case where the weather information regarding the weather when the detection information has been detected by the predetermined detection device is similar to weather information regarding weather when the waveform information having the predetermined context has been detected in the past.

11. A non-transitory computer-readable recording medium having stored therein an output program for causing a computer to execute:
a prediction procedure of predicting whether or not waveform information having a predetermined context is generated on a basis of voice detection information detected by a predetermined detection device; and
an output procedure of outputting waveform information having an opposite phase to the waveform information having the predetermined context in a case where it has been predicted that the waveform information having the predetermined context is generated,
wherein the prediction procedure predicts whether or not the waveform information having the predetermined context is generated on a basis of weather information regarding weather when the detection information has been detected in the past by the predetermined detection device, and
wherein the output procedure outputs the waveform information having the opposite phase to the waveform information having the predetermined context in a case where the weather information regarding the weather when the detection information has been detected by the predetermined detection device is similar to weather information regarding weather when the waveform information having the predetermined context has been detected in the past.

* * * * *